(No Model.)
P. FORG.
BED FASTENING.
No. 256,560.    Patented Apr. 18, 1882.
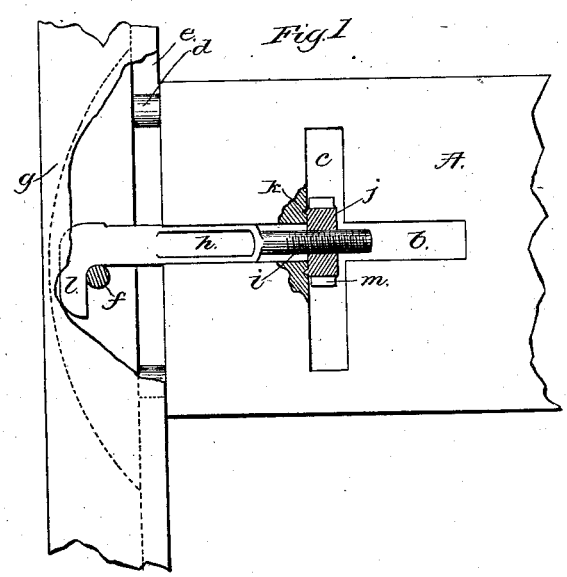
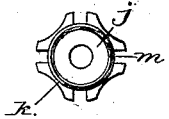
Witnesses
John F. C. Pirinkert
Bernice J. Noyes
Inventor:
Peter Forg,
by Crosby Gregory
Atty's

UNITED STATES PATENT OFFICE.

PETER FORG, OF SOMERVILLE, MASSACHUSETTS.

BED-FASTENING.

SPECIFICATION forming part of Letters Patent No. 256,560, dated April 18, 1882.

Application filed December 19, 1881. (No model.)

*To all whom it may concern:*

Be it known that I, PETER FORG, of Somerville, county of Middlesex, and State of Massachusetts, have invented an Improvement in Bed-Fastenings, of which the following description, in connection with the accompanying drawings, is a specification.

This invention has for its object the production of a simple and cheap bed-fastening, one which may be easily operated and be readily attached to the side rails of the bed.

In this my invention I employ a hook the head of which is adapted to engage a pin on the post, and upon the screw-threaded shank of the hook I have placed a nut provided at its side toward the post or hook with a fastening annulus or spurs adapted to cut into the rail and prevent the shank or part of the fastening-hook outside the post from being thrown laterally out from the groove in the side rail in which the said shank is placed.

Figure 1 represents in elevation and partial section a sufficient portion of the inner side of the end of a side rail of a bed and one of its posts to illustrate my invention, and Fig. 2 is a face view of the nut removed from the shank of the fastening-hook.

The side rail, A, has at its inner side two right-angled slots, $b\ c$, to receive the fastening-hook $h\ l$, screw-threaded at $i$, and the nut $j$. The bent end $l$ of the fastening-hook engages a transverse pin, $f$, in a slot made in the post $g$. A pin or dowel, $d$, on the side rail enters a slot, $e$, in the post. The nut $j$ has notches or openings $m$ at its edge, by which to engage and turn it on the screw-threads $i$ of the fastening-hook, and also an annular spur, $k$, at that side of it toward the bent end $l$ of the fastening device, which spur, as the nut is turned upon the screw-thread $i$, with the parts as in Fig. 1, will cause the spur $k$ to cut into the wood of the side rail, which is of importance, in that it prevents the fastening device from being moved laterally out from the slot $b$ and the nut from the slot $c$. This spur $k$, instead of being a complete annulus, may be only part of an annulus.

The side rail may have a thin block or piece of wood screwed to it to cover the slots $b\ c$ and the fastening-hook.

The nut $j$, with its spur $k$ entering the wood of the side rail, so holds the fastening-hook that it cannot be moved out laterally from the slot $b$ as the bed is moved about and force the said covering-block off from the inner side of the side rail.

I claim—

A bed-fastening composed essentially of the hook $h\ l$, having a screw-threaded shank, and a nut, $j$, provided at its side next the hook $l$ with a spur to cut into the side rail and prevent the nut and fastening from being moved laterally out from the grooves in the side rail, substantially as described.

In testimony whereof I have signed my name to this specification in the presence of two subscribing witnesses.

PETER FORG.

Witnesses:
 G. W. GREGORY,
 BERNICE J. NOYES.